Reissued May 11, 1926. Re. 16,350

UNITED STATES PATENT OFFICE.

JOHN BIRD, OF CAMDEN, MAINE.

COMPOSITION FOR REMOVING CARBON DEPOSITS.

No Drawing. Original No. 1,565,779, dated December 15, 1925, Serial No. 35,025, filed June 4, 1925. Application for reissue filed January 12, 1926. Serial No. 80,843.

My invention relates to a composition and the use of the same in a chamber connected preferably with the intake manifold of an internal combustion motor, through which chamber air is drawn by the operation of the motor and mixing with the gases produced by the volatilization of the composition, will prevent the deposit of carbon in the motor and remove the carbon deposits therein.

For this purpose I use an ammonium salt, such as ammonium carbonate which on exposure to the air becomes ammonium bicarbonate, and I at present prefer to combine the ammonium carbonate in powdered form with naphthalene in varying proportions but usually in the proportion of about twelve and one half (12½%) per cent of ammonium carbonate to about eighty-seven and one half (87½%) per cent of naphthalene.

For convenience in manufacture, distribution and use I now prefer to mix the naphthalene in powdered form with the powdered ammonium carbonate and a small percentage, about $\frac{1}{10}$ of 1 per cent of coloring matter for distinguishing purposes, and press the mixture into small tablets, one or more of which are placed in the mixing chamber so that the air when the motor is running will be drawn through the chamber and around the tablets, and the intimate mixture, in this example of my invention, of air, ammonia carbon dioxide and volatilized naphthalene thus produced, will be drawn into the motor valves, cylinders and connections.

The naphthalene when used in the composition not only acts as a binder for forming the tablets, but also acts to retard combustion in the motor and thus cause a more complete combustion of the fuel gases, while at the same time loosening the deposit of carbon.

The most active element in the composition is the ammonium salt, in this example, ammonium carbonate or the naturally resulting ammonium bicarbonate. Ammonium carbonate at the temperature of the running motor, above 750° C., decomposes into ammonia and hydrogen and at such temperature the ammonia combines with carbon, the ammonia being partly dissociated and partly converted into hydrocyanic acid.

The deposit commonly called "carbon" in motor cylinders contains a substantial proportion of dust or silicates also, bound together by the carbon.

The ammonia therefore combining with the carbon, frees the silicates from their binder so that not only the carbon but the dust is removed by the vapors of my composition from the motor cylinders, valves and connections through the exhaust.

The ammonium carbonate I prefer to use in my composition is the ordinary commercial ammonium carbonate which is a mixture of ammonium carbonate and bicarbonate and ammonium carbamate. On exposure to the air, the real ammonium carbonate loses ammonia and is converted into bicarbonate.

The ammonium bicarbonate is easily decomposed giving off ammonia and carbon dioxide. The ammonium carbamate is converted into ammonium carbonate by moisture and then reacts as above, or, in the absence of moisture, it decomposes easily into ammonia and carbon dioxide just as the bicarbonate does.

I claim as my invention:

1. A composition for removing carbon as described consisting of commercial ammonium carbonate and naphthalene.

2. A composition for use as described consisting of ammonium carbonate and naphthalene.

3. A composition for removing carbon consisting of naphthalene and an ammonium salt derived from carbonic acid.

4. A composition consisting of ammonium carbonate and powdered naphthalene.

In testimony whereof I affix my signature.

JOHN BIRD.